United States Patent [19]

Glassey

[11] Patent Number: 6,142,017

[45] Date of Patent: Nov. 7, 2000

[54] HYDROSTATIC PRESSURE EQUALIZER APPARATUS AND SYSTEM

[76] Inventor: Eugene A. Glassey, 3717 Notre Dame Ave., San Diego, Calif. 92122

[21] Appl. No.: 09/247,697

[22] Filed: Feb. 10, 1999

[51] Int. Cl.[7] .................................................. G01F 23/14
[52] U.S. Cl. ............................................. 73/299; 073/301
[58] Field of Search ............................ 73/299, 300, 301, 73/302, 303

[56] References Cited

U.S. PATENT DOCUMENTS

| | | | |
|---|---|---|---|
| 1,707,768 | 4/1929 | Powell . | |
| 1,896,637 | 2/1933 | MacCallum, Jr. . | |
| 3,922,915 | 12/1975 | Andrews | 73/302 |
| 4,006,636 | 2/1977 | Holmen | 73/302 |
| 5,005,408 | 4/1991 | Glassey | 73/301 |
| 5,279,161 | 1/1994 | Glassey et al. | 73/708 |
| 5,315,876 | 5/1994 | Glassey et al. | 73/708 |

FOREIGN PATENT DOCUMENTS

| | | | |
|---|---|---|---|
| 47417 | 4/1980 | Japan | 73/302 |
| 288468 | 5/1953 | Switzerland | 73/302 |

OTHER PUBLICATIONS

Pugh, D. T., "The Physics of Pneumatic Tide Gauges," International Hydrographic Review, date unknown (>20–25 years old), pp. 71–97.

"Accel" brochure, 1994, Fluid Data Systems, USA.
"BOC (Bubbler Orifice Chamber)" brochure, 1995, Bulletin BOC–1, Fluid Data Systems, USA.
"WaterGage V" brochure, 1997, Bulletin G5–1, Fluid Data Systems, USA.
"WaterGage V" document, 1997, Internet document, Fluid Data Systems, USA.
"All–Climate, High Reliabilty WaterGage V Holds Remarkable Promise in Flood–Warning, General Water–Stage Monitoring and Other Hydrologic Science" article/brochure, 1997, Fluid Data Systems, USA.

*Primary Examiner*—Daniel S. Larkin
*Assistant Examiner*—Willie Morris Worth
*Attorney, Agent, or Firm*—Brown, Martin, Haller & McClain, LLP

[57] ABSTRACT

A hydrostatic pressure equalizer device is attached to the lower submerged end of a gas supply line. A hollow housing forms an internal cavity having a closed upper end and a lower end, and an end plate extends over at least part of the lower end to leave a gap for liquid flow into the cavity. The gas supply line extends through the end plate and upwardly into the cavity to terminate at a raised position which will be in an air pocket above the liquid level in the cavity. A pressure monitoring instrument connected to the line detects pressure in the air pocket, which in turn is equal to the hydrostatic pressure in the cavity and the surrounding liquid.

21 Claims, 3 Drawing Sheets

HYDROSTATIC PRESSURE EQUALIZER APPARATUS AND SYSTEM

BACKGROUND OF THE INVENTION

The present invention relates generally to an improved alternative for purge gas bubble gages for the monitoring of hydrostatic pressure at a submerged reference elevation that is customarily close to the bottom or bed of a body of water, to approximately determine the water depth, and is particularly concerned with a hydrostatic pressure equalizer apparatus for use in such systems.

It will be understood that dual systems may be employed for the monitoring of bulk density of liquids in the same manner that a dual system is shown on the front page of my U.S. Pat. No. 5,005,408. It will also be understood that the described technology is not limited to water, but is applicable to all liquids, as in tank gauging.

Various instruments are known for monitoring submerged pressure, and thus liquid level, in lakes, reservoirs, rivers, tanks, and other bodies of water or other liquids. One category of such liquid level monitoring instrument is a hydrostatic or purge gas pressure monitoring system, as described in my prior U.S. Pat. Nos. 5,005,408 and 5,315,876. In such systems, a small diameter piezometer line runs from an instrument shelter above the water or liquid surface down to a reference position near the bottom of the body of water. A trace flow of pressurized gas is passed down the tube, escaping as bubbles at the lower end. The pressure of gas escaping at the bottom of the tube is a function of the pressure of the medium into which it is bubbled, and the bubble gas pressure can be monitored by a suitable pressure responsive instrument secured to the upper end of the bubbler tube, as described in my previous patents referred to above. These systems are typically referred to as "bubble gages" in view of the release of bubbles into the liquid from the tube.

There are a number of problems with so-called bubble gages, such as errors incurred as a result of capillary effects and bubble release transients. In flood conditions, the bubbler line may become buried in sediment. It is very difficult to get bubbles to rise through sediment, with the result that pressure monitoring is difficult and inaccurate, if not impossible, under such conditions. Random errors of bubbler systems resulting from water rising in the bubble line, which often occurs under flood or tidal conditions, from bubble outlets being buried in sediment, and from bubble transients, are not possible to quantify with precision.

SUMMARY OF THE INVENTION

It is an object of the present invention to provide a new and improved apparatus for avoiding or reducing the random errors of previous bubbler systems for measuring hydrostatic pressure at a submerged elevation in a body of liquid.

According to one aspect of the present invention, a hydrostatic pressure equalizer device is provided for attachment to the lower submerged end of a piezometer line connected to a source of pressurized gas, which comprises a hollow member defining a cavity having a closed upper end and a lower end, which in the preferred construction has a bottom plate for extending over at least part of the lower end of the cavity to define a gap to allow water to flow into the cavity, and the end plate having an opening for guiding the end of a gas supply line into the cavity so that an outlet end of the line is normally positioned above a water level in the cavity, whereby a pressure monitoring device connected to the gas supply end of the gas supply line above a body of liquid will detect a pressure which is a function of the hydrostatic pressure in the cavity, and this in turn is equivalent to the hydrostatic pressure at the surface of the water in the cavity at the submerged level.

A hydrostatic pressure monitoring system utilizing the hydrostatic pressure equalizer device of this invention distinctly differs from purge gas systems in that, in the preferred construction, there are no bubbles nor continuous gas flow as are characteristic of purge gas bubble gages. The term "purge gas" has been replaced with "replenishment gas" in the following.

It will be understood that the piezometer line and hydrostatic pressure equalizer may be augmented with microprocessor based electronics to facilitate operation as shown in U.S. Pat. No. 5,315,876, as later described. A microprocessor based system is capable of providing phenomenal true accuracy as compared to bubble gages. By contrast, however, microprocessors are optional. The gas control and other attributes can be the same as employed in bubble gages, except the gas flow can be greatly reduced or even shut off entirely.

The bottom plate may be formed integrally with the hollow member, with one or more openings defining the gap. Alternatively, a separate end plate may be secured in the open lower end of the cavity with a gap between the plate and hollow member.

Preferably, a guide tube projects upwardly from the opening in the end plate to a raised level in the cavity which will normally be above the water surface, and the gas supply line extends upwardly through the guide tube so that the outlet end of the line is correctly positioned above the water surface. The hydrostatic pressure equalizer device takes advantage of the fact that the pressure of air trapped in a pocket equals the pressure of the water immediately beneath it (ignoring, for the present, the small weight of the gas itself). Thus, if a line or tube is run from the air pocket to a pressure sensor above the body of water in which the pocket is submerged, the pressure in the cavity may be readily determined. Instead of blowing bubbles out of the end of a piezometer line or tube directly into the water, which has several inherent errors of a random nature, the submerged end of the line with this invention terminates in a compatible gas, rather than water, so that there are no bubbles and no bubble-induced errors and often troublesome pressure transients.

In a preferred embodiment of the invention, the hollow member is a cylindrical, cup or tuna can-shaped member which has a relatively large cross-sectional area relative to the cross-sectional area of the line outlet. The gas supply tube does not have to supply a continuous gas flow, unlike a bubble gage, since it does not have to create bubbles in a liquid medium. All that is needed is a miniscule amount of replenishment gas to compensate for any gas lost from the cavity due to absorption in the water or being washed out by currents or wave action. Because of this, the supply line can be made much smaller in diameter than in traditional bubble gages. The tube preferably has the dimensions of a capillary tube of around ⅛ to 1/16 inch outer diameter with a wall thickness of 10 to 20 thousandths of an inch. The cross-sectional area ratio of the cup-shaped cavity to the supply line or tube may be varied according to the specific application, but area ratios above 2500 to several thousand are very practical. One preferred embodiment for general use employs a cavity diameter of around four inches. Another advantage of this system is that only a small amount of gas must be supplied to the cavity. Gas consumption is much smaller than for traditional bubble gages. In fact, in the most preferred mode, the gas supply can be turned off altogether for months at a time, while still providing a remarkably accurate reading of hydrostatic pressure.

The bottom plate may be of slightly smaller diameter than the open end of the cavity, so as to provide the necessary gap for water flow into the cavity and draining of sand, sediment and the like from the cavity. The device may be mounted on a concrete block or the like at the bed of a body of water, such as a flood channel, river, lake, or the like. The device may even be buried in sediment. In this case, the end plate is preferably of larger diameter than the open end of the cavity, and extends across the bottom to prevent excessive amounts of sediment from entering the cavity. The larger bottom plate is secured across the end of the cavity with a small gap between the bottom of the cavity and plate for admitting water into the cavity.

There are many advantages to burying the hydrostatic pressure equalizer device in sediment. It will still provide an accurate pressure reading, while being isolated from tidal effects, sediment as a result of flood conditions, and the like. Pressure monitoring devices or bubble gages in flood channels in the past have been susceptible to many problems as a result of the bubble gage outlet becoming buried in sediment during floods, and thus giving highly inaccurate results. The cavity or pressure equalizer device of this invention is relatively immune to such problems since it can operate accurately even when buried in sand-like sediment several feet deep.

Sediment can be flushed out of the cavity with either gas or water. Air would commonly be admitted through a separate garden hose size line in the side or by high pressure water through the piezometer line.

According to another aspect of the present invention, a hydrostatic pressure monitoring system with a hydrostatic pressure equalizer cavity is provided, which comprises a tubular line having a first, outlet end and a second end, a hollow member having an internal cavity connected to the outlet end of the line for submerging in a medium to be monitored, the cavity having a closed upper end and a lower end, an end plate partially closing the lower end of the cavity and having an opening, the outlet end of the line extending through the opening in the end plate and into the cavity, and terminating at a predetermined raised position which will be above the normal liquid level when the cavity is submerged, a gas supply connected to the second end of the line, a pressure responsive instrument connected to the second end of the line for producing an output proportional to the pressure in the line, and a data processing unit connected to the output of the pressure responsive instrument for correcting the pressure output for various systematic errors and providing a corrected output signal at periodic intervals.

A valve is provided for controlling the supply of gas to the line. The gas supply may be a continuous, very small flow or may be intermittent, with the gas supply turned off for extended periods of time. Several alternative methods of control are possible and will be apparent to people schooled in pneumatic controls. The choice is dependent upon the application. For example, a water level detector may be mounted in the cavity and linked to the gas supply valve so as to turn on or increase the gas supply only when the water level rises to a predetermined maximum level, for example in flood conditions. The gas supply required to operate the system under normal operating conditions is very low, of the order of only 1 milliliter per minute. This could be provided by a single 250 cubic feet cylinder of nitrogen gas for up to 13 years.

In one embodiment of the system, the hollow member is secured to a slab of concrete resting upon the bed of a body of water, with the end plate raised a small distance above the mounting slab to permit entry of the capillary line through the plate opening. In another embodiment, the hollow cavity member is simply buried in sediment. Alternatively, the device may be secured in the bottom of a concrete lined hole in a flood channel or the like, that will be referred to as "Mike Holes", and may then be buried in sediment.

Preferably, a guide tube projects upwardly from the plate opening into the cavity for guiding the gas supply line through the opening and tube up to the predetermined height above the normal water level in the cavity. With this arrangement, all the disadvantages and random errors encountered in a traditional bubbler system, where bubbles must be forced out of the end of a tube or line into the surrounding liquid, are avoided. In this invention, the pressure sensor measures the static pressure of gas in the cavity above the water level, rather than in the water itself. This static pressure will equal the pressure of the water beneath. Only miniscule amounts of gas need to be used to compensate for attrition caused by such things as gas absorption by the water, or gas forced out of the cavity by wave action or the like.

In my U.S. Pat. No. 5,005,408 referred to above, a gas weights error compensation method for bubbler systems is described, in which the data received from the pressure sensor is compensated for so-called "gas weights" errors, which are systematic errors arising from the vertical weight of gas in the bubbler tube. A similar gas weights compensation is provided in the microprocessing unit of this invention. Preferably, a device for measuring temperature along the gas supply line is also provided, as described in my subsequent U.S. Pat. No. 5,315,876, and the data processing unit is connected to this device and programmed to compensate the output signal for temperature variations, as also described in U.S. Pat. No. 5,315,876. These prior patents described techniques for compensating for systematic errors in bubbler systems. However, these prior systems still had no way of compensating for chaotic or random errors associated with bubble gage lag, sediment covering the bubble outlet orifices, water rising in the bubbler tube, bubble transients, capillarity, and the like. The system of this invention can readily provide compensation for systematic errors, while substantially or completely eliminating random errors due to the piezometer line being terminated in gas above the water level rather than being submerged in liquid as in the past.

The hollow member may have an additional inlet above the water level in the cavity for periodic connection to a supply of high pressure liquid or gas. This may be needed in some installations where the cavity tends to fill up with sand, dirt, sediment or the like. Whenever such conditions are detected, the high pressure supply to the cavity may be turned on to blow or wash such material out of the cavity, returning it to normal operation.

Copper is a preferred material for the cavity, when used in water, because it greatly retards algae growth. This becomes especially true when nitrogen is employed as the replenishment gas.

The hydrostatic pressure equalizer apparatus and system of this invention has the capability of providing a much more accurate measurement of hydrostatic pressure in a liquid, which in turn provides a more accurate reading of water stage in a body of water. An immediate indication of rising water stage can thereby be provided, which is critically important in rising flood conditions. There are many possible uses for this system in fixed bodies of water such as reservoirs, moving bodies of water such as rivers, and in flood channels. The cavity may be lowered into ground water monitoring wells, suspended by the gas supply line. Initial contact with water will be accurately indicated by the start of pressure buildup, as monitored by the pressure sensor at the top of the line.

The operation of the pressure equalizer device of this invention may be understood with reference to underwater caves. An underwater cave will often have air pockets along the ceiling. The pressure of air trapped in such pockets is equal to the hydrostatic pressure of the water beneath it. The hydrostatic pressure of the water in the cave, at the same time, is equal to the hydrostatic pressure of water surrounding the cave at the same depth. Clearly, measuring the pressure in the static air pocket can therefore provide an output proportional to the hydrostatic pressure of the water at that depth, which in turn can provide a computation of the water depth. The present invention applies this principle and replaces the underwater cave with a simple cavity secured to the end of a gas supply line which extends into the cavity and has an outlet which will be raised above the water level.

The hollow or cup-like member forming the cavity preferably has a relatively large diameter relative to its height, such that the air/water interface level will change less as the air is compressed. The partial closure or end plate across the open, lower end of the cavity reduces the amount of air forced out of the cavity by water currents, waves, or sudden surges, and also restricts the amount of sediment entering the cavity. The end plate also provides a guide for the gas supply line into the cavity. It is preferable for the gas supply line to enter through the lower end of the cavity, since this eliminates a possible source of gas leak from the cavity.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
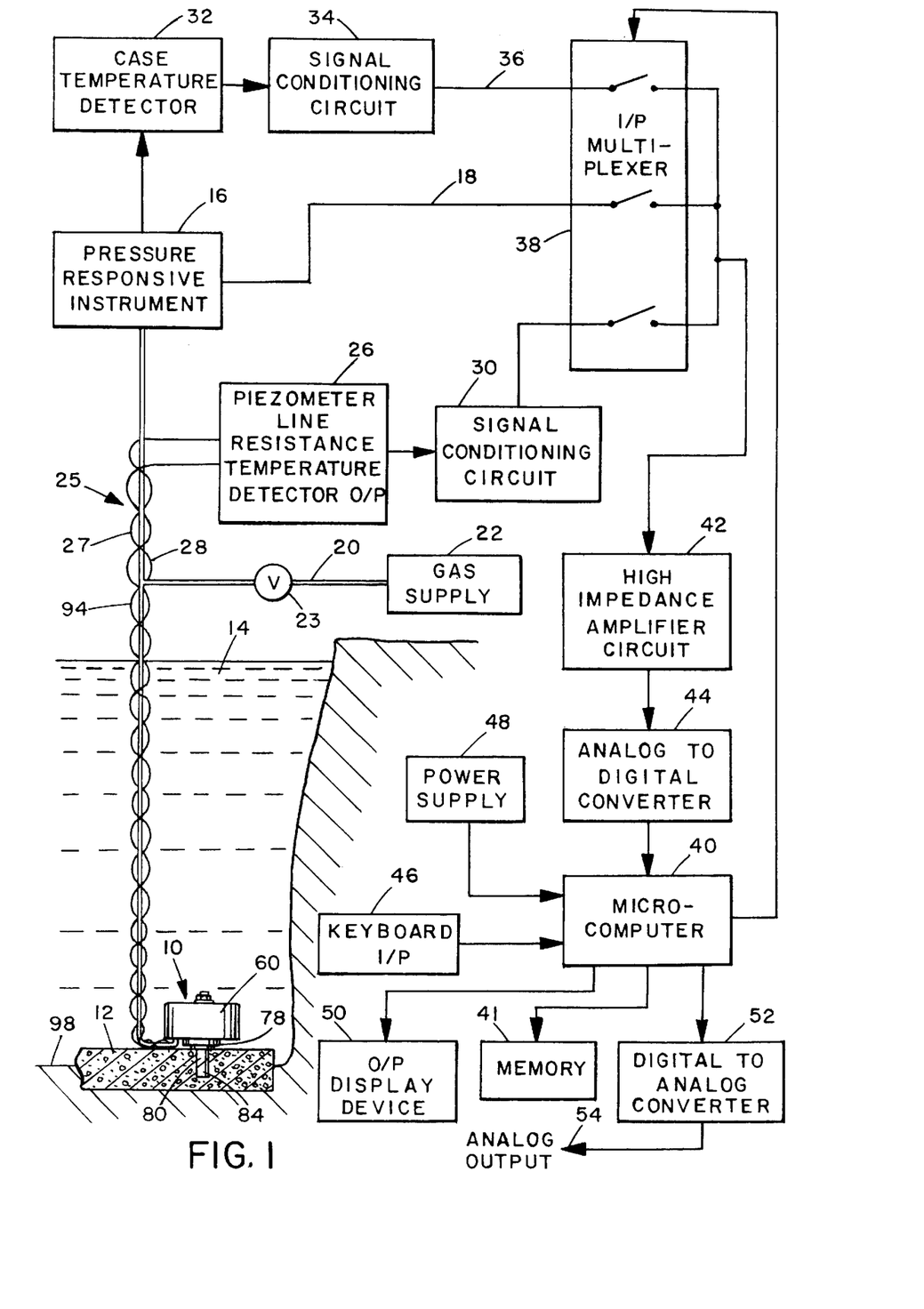
FIG. 1 is a diagram of the complete system with the hydrostatic pressure equalizer unit according to a preferred embodiment of the invention mounted on a base on the bed of a body of water.
Figure 4:
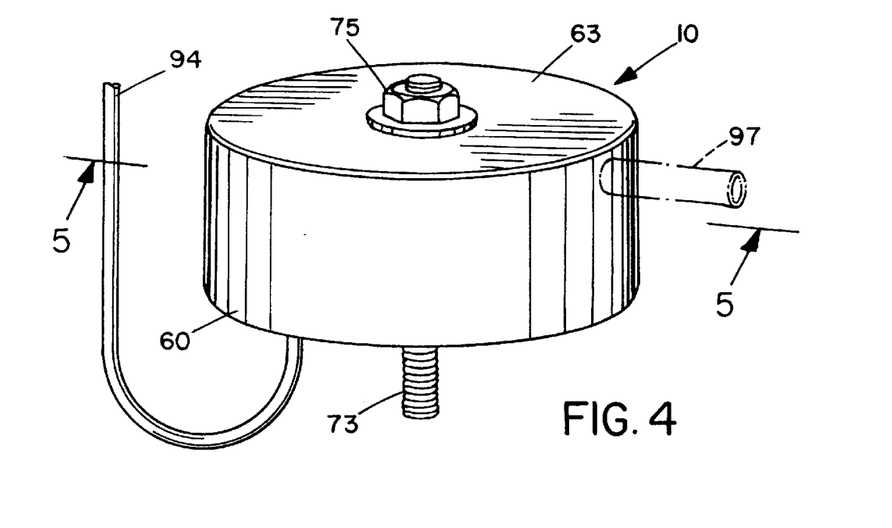
FIG. 4 is a perspective view of the hydrostatic pressure equalizer unit.
Figure 5:
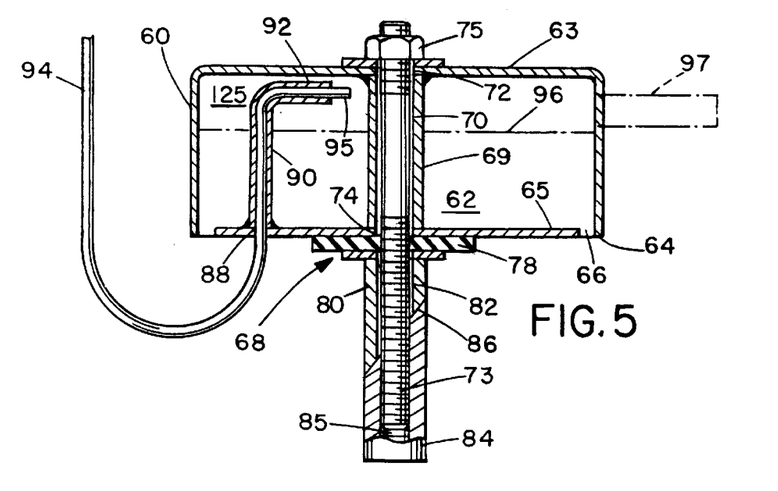
FIG. 5 is a sectional view taken on line 5—5 of FIG. 4.

FIGS. 4 and 5 illustrate a hydrostatic pressure equalizer unit 10 according to a preferred embodiment of the present invention, while FIG. 1 illustrates the unit 10 installed on a support or base 12 at the bed of a body 14 of water.

The hydrostatic pressure equalizer unit 10 of FIGS. 4 and 5 will first be described. Unit 10 basically comprises a hollow cylindrical member or housing 60 of metal such as copper, steel, or the like forming a cavity 62 having a closed upper end 63 and an open lower end 64. An end plate 65 is secured in the open lower end of the cavity as illustrated in FIG. 5, and has a diameter slightly smaller than that of housing 60, to leave a small annular gap 66 between the outer edge of the plate and the lower end of housing 60.

The plate 65 is secured at the lower end of the housing 60 by a fastener assembly 68. A central cylindrical boss or tube 69 extends from the upper end 63 to the lower end 64 of the cavity, defining a through bore 70 through housing 60 which is aligned with central opening 72 in end wall 63. A threaded shaft 73 extends through the opening 72, through bore 70, and through a central opening 74 in plate 65. A first nut 75 is secured to the shaft 73 at the upper end of housing 60, and a second lock nut device 76 is secured to the shaft 68 below plate 65. The plate is secured in position by tightening nuts 75 and 76. A resilient washer 78 is mounted between nut 76 and plate 65 to provide a spacer. Preferably, lock nut device 76 is a two part locking sleeve to resist loosening of the nut while the unit is in use, comprising an upper sleeve 80 with a through bore 82, and a lower sleeve 84 with a threaded through bore 85 which is threaded onto the end of shaft 73. A diagonal cut 86 separates the sleeves 82 and 84, such that a taper lock is provided between the two sleeves. This locking arrangement is of a form widely employed for bicycle handlebar posts.

Plate 65 also has an opening 88 spaced outwardly from opening 74, and a guide tube 90 projects upwardly from opening 88 towards the closed upper end of the cavity. Tube 90 has a bent end portion 92 extending parallel to the cavity end wall 63 and spaced slightly below it. The end of a small diameter capillary tube 94 extends through opening 88 and guide tube 90 to project out of the end of guide tube 90 so that the outlet orifice 95 is positioned in air pocket 125 at a raised position in the cavity, which will normally be raised above a water level 96 in the cavity, as will be explained in more detail below. Capillary tube 94 preferably has an outer diameter in the range from 1/8" to 1/16" and is of a suitable material for the application such as stainless steel, copper, nylon, Teflon®, Kevlar®, aluminum, or the like. Optionally, a larger diameter input 97 may also be provided into the upper end of cavity 62, as illustrated in the dotted outline in FIG. 5, for reasons which will be described in more detail below in connection with FIG. 6.

Although the embodiment of FIGS. 4 and 5 has a separate end plate which is secured to the open end of housing or member 60 by the fastener assembly 68, it will be understood that housing 60 may instead be provided with an integral lower end wall having openings for water entry into the cavity, as well as an opening and guide tube for guiding the gas supply and pressure monitoring line into the cavity.

FIG. 1 illustrates the hydrostatic pressure equalizer or HPE unit 10 installed at the floor 98 of body 14 of water. The fastener assembly 68 is preferably embedded in a drilled hole in a concrete base 12 as indicated, with the end plate 65 spaced slightly above base 12 by washer 78, to provide a clearance for the tube or line 94 which enters the cavity via plate 65 as indicated.

The upper end of line 94 extends above the surface of water or other liquid and is connected to a monitoring system substantially as described in my U.S. Pat. No. 5,315,876 referred to above, the contents of which are incorporated herein by reference. Line or tube 94 is connected to a supply of pressurized gas such as nitrogen via valve 23 along line 20. The upper end of line 94 is connected to a pressure responsive instrument 16 which may be a balanced beam manometer or a pressure transducer, as described in my U.S. Pat. No. 5,005,408 referred to above. The output signal of instrument 16 is connected via line 18 to an input multiplexer 38.

A temperature detector 25 is provided along the length of line 94 to the unit 10, and preferably comprises a resistance wire with opposite legs 27,28 spirally wound along the length of tube or line 94 as illustrated. The temperature detector output 26 is connected via signal conditioning circuit 30 to the input multiplexer 38. Preferably, a case temperature detector 32 is connected to the case of instrument 16, and has an output 36 connected via signal conditioning circuit 34 to the input multiplexer 38. The outputs of the pressure responsive instrument and two temperature detectors are connected to microcomputer or data processing unit 40 via a high impedance amplifier circuit 42 and analog to digital converter 44. Microcomputer 40 has a power supply 48, a keyboard input 46, memory 41, and an output display device 50 such as a video screen connected to the output. A second, analog output 54 is provided via analog to digital converter 52, to provide an analog signal compatible with conventional analog data loggers and the like which are typically used in hydrostatic pressure monitoring systems. A printer output (not illustrated) is preferably also provided.

The microcomputer 40 is programmed as described in my prior U.S. Pat. Nos. 5,005,408 and 5,315,876 referred to above to compensate the output from instrument 16 for gas weights, temperature changes, and other systematic errors. This error compensation method is described in detail in my prior patents and therefore will not be repeated here. It will be understood that, if the pressure responsive instrument is a pressure transducer, a gravity compensation factor will also be provided to compensate for the variation of weight of gas and displaced atmosphere in the column with variations in gravity based on the geographical location of the system installation. Gravity compensation is not necessary when using a balanced beam manometer to measure the pressure.

Figure 2:
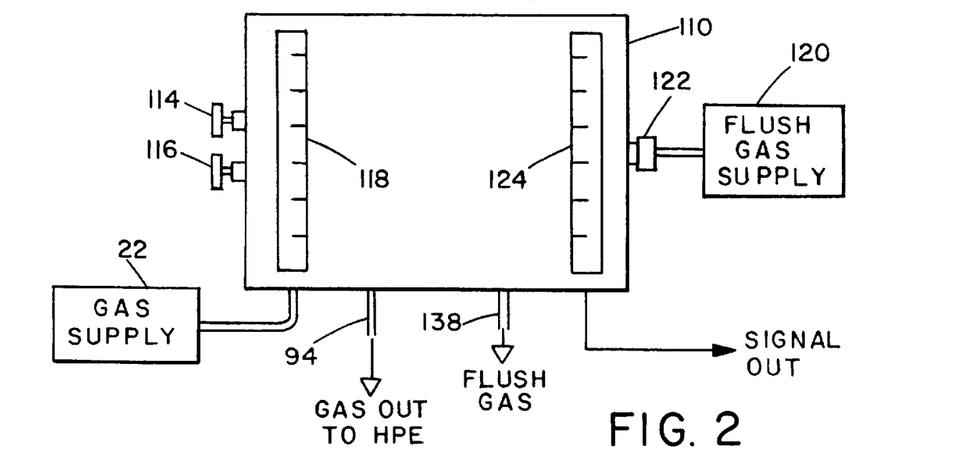
FIG. 2 is a diagram of the instrumentation unit and the connections.
Figure 3:
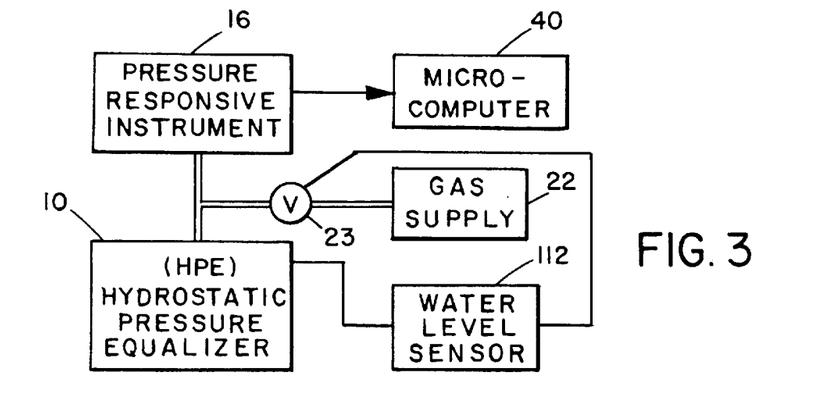
FIG. 3 is a diagram of the control system.

FIG. 2 illustrates a preferred sealed housing or cabinet 110 for housing the instrumentation of FIG. 1, while FIG. 3 is a simplified schematic block diagram of the system with an added water level sensor 112 installed in cavity 95. The gas supply 22 is connected to housing 110 by a suitable quick connect fastener (not illustrated) and is connected to a suitable valve assembly within the housing. The valve assembly is connected to a pair of gas supply adjustment knobs 114,116 on the side of the housing, for coarse and fine adjustment of the gas flow rate, respectively. Preferably, both adjustment knobs are precision micrometer knobs to provide very fine adjustment of the flow rate. A replenishment gas flow gage 118 on the front of the housing provides an indication of the flow rate of gas into 10 the line 94. A flush gas supply 120 is connected to the housing or cabinet via manually adjustable flow control knob or valve 122. This provides a continuous flow of nitrogen gas into the housing, which increases the lifetime of electronic components by excluding moisture, dust, and insects from the housing. A second gage 124 on the front of the housing provides an indication of the flush gas flow into the housing, which can be set at a desired level.

As illustrated in FIG. 3, a water level sensor may be provided for sensing water level inside the cavity 62 and providing an output to control valve if the level rises above a predetermined maximum level, indicating that water is surging in to fill the cavity. The water level sensor may be any conventional form of surface detector, but preferably is a miniature sonar or light sensor secured inside the upper end of the cavity facing the water surface. The sensor output will open up the valve to temporarily supply more gas to the air pocket 125 in the top of cavity 62, forcing water out of the cavity.

Operation of the system with the attached hydrostatic pressure equalization unit as illustrated in FIGS. 1 to 5 will now be described in more detail. It will be understood that the pressure equalizer unit 10 may be installed in many different situations to monitor water stage, including lakes, reservoirs, rivers, canals, and the like, as well as in liquid tank gauging. When the unit is submerged, an amount of water or other liquid will enter the cavity 62 via annular gap 66, and will fill the cavity to a certain level 95 until the pressures inside and outside the cavity are equalized. At this point, an air pocket 125 is created with the pressure of air being equal to that of the water beneath it in the cavity, as well as the water pressure surrounding the cavity. The outlet end 126 of the line 94 is positioned in the air pocket 125, as illustrated in FIG. 5, and will therefore convey a measurement of the static pressure within pocket 125 to the pressure responsive instrument 16 at the upper end of line 94. Since there is no need to create bubbles with this arrangement, there is no need for a continuous supply of gas from supply 22 into line 94. All that is needed is a very low, intermittent or continuous gas flow simply to replenish any gas lost from the cavity as a result of water absorption of gas or swishing action of water in the cavity sweeping gas out of the cavity.

This permits the line 94 to be of much smaller diameter than in bubbler systems, and also reduces the gas consumption of the system considerably. It has been found that a gas flow rate of 1 milliliter per minute will be sufficient for most situations, and in fact the gas supply can be turned off for extended periods of time without affecting proper monitoring operation of the system.

The use of end plate 65 has several advantages. First, it closes off a substantial portion of the lower end of the cavity, retarding air from being forced out of the cavity by waves, currents or other swishing actions. Secondly, it reduces the amount of sediment which can be swept into the cavity. Thirdly, it provides a mounting plate for the guide tube 90 which correctly positions the outlet end of the line 94 in the air pocket 125.

The cavity in the preferred embodiment is generally cylindrical and shaped like an inverted cup or can. However, it will be understood that any shaped object with a cavity can serve the same purpose. It is preferable that the hydrostatic pressure equalizer unit defines a relatively shallow, large diameter cavity to reduce variations in water height in the cavity. Preferably, the cross sectional area of the cavity relative to the tube or line 94 is large, and may be in the range of hundreds or thousands.

Figures 6, 7:
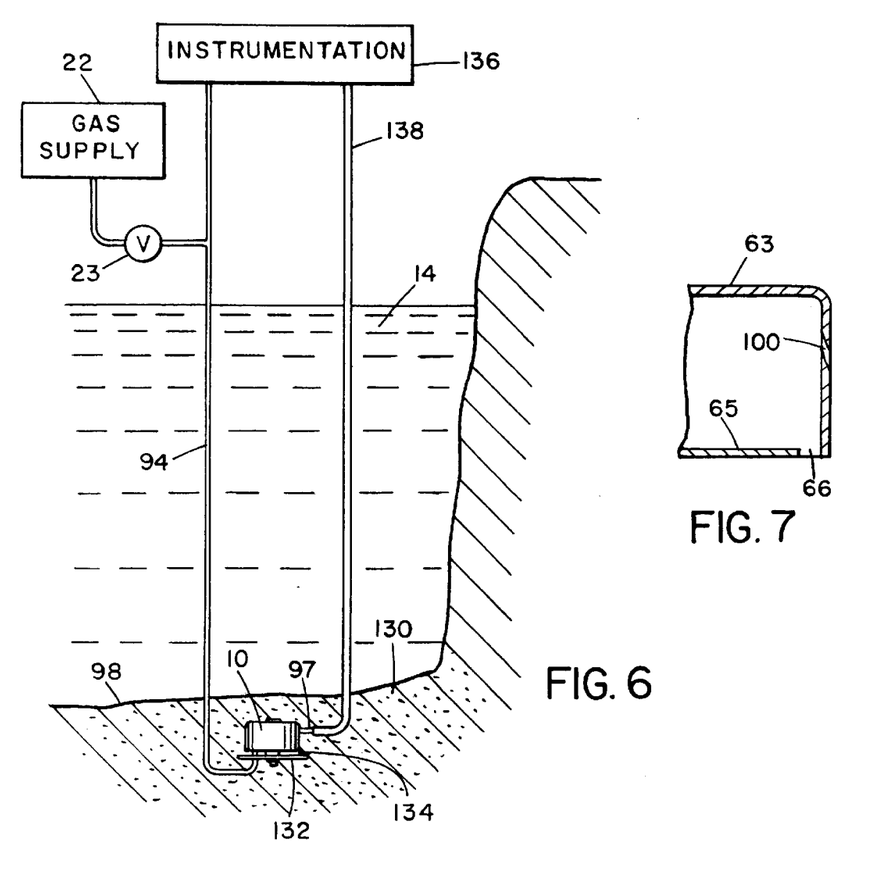
FIG. 6 is a view generally similar to FIG. 1, but with the pressure unit embedded in the silt at the bottom of the body of water.
FIG. 7 is a partial cross-sectional view of a portion of the side wall of FIG. 5 illustrating an optional opening for pressure equalization.

FIG. 1 illustrates the unit 10 secured at the floor of a body of water. However, the HPE unit may alternatively be buried in sediment 130, as illustrated in FIG. 6. This arrangement has advantages since the unit 10 will not be affected by wave action, surges, sudden flood conditions, and the like, to comparable extent as a unit located in the body of water. This alternative is particularly useful in flood channels and other locations liable to be exposed to sudden rises or flows of water. Unit 10 is identical to that of FIGS. 1,4, and 5 apart from a modified end plate 132, which is of larger diameter than plate 65 and is secured across the open end of unit 10 at a slight spacing 134 to provide a gap for water flow into the cavity and sediment flow out of the cavity. The larger diameter end plate 132 will help to restrict passage of sediment, sand or the like into the cavity. Further, sediment can be washed out by water in circular motion, rather than vertical. The unit 10 as illustrated in the system of FIG. 6 is otherwise identical to that of FIGS. 4 and 5 and will not be described in more detail.

As in the system of FIG. 1, the gas supply line 94 extends from the interior of the cavity within unit 10 up to pressure monitoring instrumentation 136 above the water level, which measures hydrostatic pressure in a manner identical to that of FIGS. 1 to 3. In this embodiment, a high pressure water or gas supply line 138 is also provided, extending from a water supply in the instrumentation housing down to the inlet tube 97 communicating with the interior of unit 10. The microcomputer or data processing unit 40 of the system will additionally be programmed to turn on the high pressure supply if it is determined that the cavity has filled partially or completely with sediment or sand. A suitable sensor (not illustrated) may be mounted in the unit 10 for this purpose, or it may be determined by the pressure output. Alternatively, the cavity may be simply flushed with water or gas at periodic intervals to ensure that it does not become too clogged with sediment or other solid particles.

The unit 10 with the larger plate 132 can therefore be buried in sand or sediment at the bottom of river beds, flood channels, at the shoreline of tidal areas, or in holes in concrete channels, protecting it from the effects of sudden gushes of water while permitting instantaneous, accurate readings of flood levels, for example. The enlarged plate 32 will restrict sediment, loose gravel, dirt, or sand from entering the cavity. At the same time, if the cavity does start to fill up, sediment can be flushed out simply by periodically turning on the high pressure water supply via tube 138 and inlet 97. One possible alternative use of the unit 10 would be to bury it a few feet beneath the ground surface in a wetland area, in order to monitor hydrostatic pressure of water in the soil. If the wetland area is inundated by flood, the output reading from unit 10 will increase.

FIG. 7 illustrates a side opening which may be employed to equalize pressure at its reference elevation, either in lieu of or to augment the bottom or end opening 66. This alternative should not materially alter the operating principles of the unit. Preferably, opening 100 is a #51 drill size opening, which approximates the smallest size hole that will pass gas without introduction of objectionably high capillarity effects. The opening is preferably drilled at an angle of approximately 15° from vertical. The bottom plate in this alternative may seal the lower end of the cavity, so that opening 100 completely replaces openings 66. In this case, the bottom plate may be of resilient material such as rubber, rather than metal. When the cavity is flushed, the rubber plate will deflect, acting as a diaphragm.

The hydrostatic pressure equalizer unit and system of this invention can be used to measure the hydrostatic pressure and surface level of any body of liquid, such as water in reservoirs, lakes, rivers, flood channels, canals, wetlands, and the like, as well as water and other liquids in tanks. It is thus applicable to both hydrology and liquid tank gauging.

The system of this invention allows more accurate results to be obtained for the hydrostatic pressure of water and other liquids at a submerged depth, and thus a more accurate calculation of actual depth. The hydrostatic pressure equalizer unit avoids the random errors which were inherent in prior bubbler systems which simply blew bubbles directly into the surrounding water. Such random errors arise when bubbler output orifices become buried in sediment, for example, when water rises in the bubbler tube, and errors resulting from bubble release transients. Once the measured hydrostatic pressure has been corrected for gas weights errors, temperature variations, and so on, as described in my previous patents referred to above, the corrected pressure can be multiplied by the water density to determine the surface water level.

Other advantages of this system are that it is reliable, simple, and inexpensive. The gas consumption is much less than with a traditional bubbler system, since only a very small amount of gas is needed to compensate for gas lost from the trapped air above the water or liquid level 96 in the cavity, and the gas supply may even be turned off completely for extended periods of time, while still receiving accurate readings of hydrostatic pressure at the outlet orifice of the line.

Although a preferred embodiment of the invention has been described above by way of example only, it will be understood by those skilled in the field that modifications may be made to the disclosed embodiment without departing from the scope of the invention, which is defined by the appended claims.

I claim:

1. A hydrostatic pressure equalizer device for attachment to the lower submerged end of a line connected to a source of pressurized gas, comprising:

a hollow housing defining an internal cavity having a closed upper end and a lower end;

an end plate extending over at least part of the lower end of the cavity;

the lower end of the housing and the end plate defining at least one gap at the lower end of the cavity for liquid flow into the cavity; and the end plate having an opening; a guide tube projecting upwardly from the plate opening into the cavity for guiding the end of a gas supply line into the cavity so that an outlet end of the line is positioned at a predetermined height above a normal liquid level in the cavity, whereby a pressure monitoring device connected to a gas supply end of the gas supply line above a body of liquid will detect a pressure which is a function of the hydrostatic pressure in the cavity, which in turn is equivalent to the hydrostatic pressure of the liquid in the cavity at a submerged level.

2. The device as claimed in claim 1, wherein the end plate is formed separately from the housing and a fastener assembly releasably secures the end plate to the open lower end of the cavity to partially close the cavity, the gap being formed between the plate and lower end of the cavity to allow water to flow into the cavity.

3. The device as claimed in claim 1, wherein the housing is a cylindrical, cup-shaped member of a predetermined first diameter.

4. The device as claimed in claim 3, wherein the end plate is a circular plate having an outer periphery, the end plate having a second diameter smaller than the first diameter, and being secured in the open end of the housing to leave an annular gap between the outer periphery of the end plate and the open end of the housing.

5. The device as claimed in claim 3, wherein the end plate is a circular plate having an outer periphery, the end plate having a second diameter larger than the first diameter, and being secured across the open end of the housing to leave a gap between the end plate and the open end of the housing.

6. A hydrostatic pressure equalizer device for attachment to the lower submerged end of a line connected to a source of pressurized gas, comprising:

a hollow housing defining an internal cavity having a closed upper end and a lower end;

an end plate extending over at least part of the lower end of the cavity;

the lower end of the housing and the end plate defining at least one gap at the lower end of the cavity for liquid flow in to the cavity;

the end plate having an opening for guiding the end of a gas supply line into the cavity so that an outlet end of the line is normally positioned above a normal liquid level in the cavity, whereby a pressure monitoring device connected to a gas supply end of the gas supply line above a body of liquid will detect a pressure which is a function of the hydrostatic pressure in the cavity, which in turn is equivalent to the hydrostatic pressure of the liquid in the cavity at a submerged level;

the end plate being formed separately from the housing;

a fastener assembly releasably securing the end plate to the open lower end of the cavity to partially close the cavity, the gap being formed between the plate and lower end of the cavity to allow water to flow into the cavity; and the fastener assembly comprising a threaded shaft extending axially through the housing and having a first portion extending upwardly from the closed end of the housing and a second portion extending through the end plate and outwardly from the lower end of the housing, a first locking nut extending over the first portion of the shaft and a second locking nut extending over the second portion of the shaft to secure the plate to the lower end of the housing.

7. The device as claimed in claim 6, wherein the housing has a central, tubular boss extending from the upper end to the lower end defining a through bore, the end plate has a central opening of smaller diameter than the through bore, and the threaded shaft extends through the bore and end plate, whereby the second locking nut secures the end plate between the boss and locking nut in the open end of the housing.

8. The device as claimed in claim 6, wherein the second locking nut comprises a two part locking sleeve assembly having an upper sleeve with a through bore fitting over the second portion of the shaft, and a lower sleeve having a threaded bore for threaded engagement over the second portion of the shaft to urge the upper sleeve against the plate.

9. The device as claimed in claim 6, including an annular, resilient washer between the end plate and second locking nut.

10. A hydrostatic pressure equalizer device for attachment to the lower submerged end of a line connected to a source of pressurized gas, comprising:

a hollow housing defining an internal cavity having a closed upper end and a lower end;

an end plate extending over at least part of the lower end of the cavity;

the lower end of the housing and the end plate defining at least one gap at the lower end of the cavity for liquid flow into the cavity;

the end plate having an opening for guiding the end of a gas supply line into the cavity so that an outlet end of the line is normally positioned above a normal liquid level in the cavity, whereby a pressure monitoring device connected to a gas supply end of the gas supply line above a body of liquid will detect a pressure which is a function of the hydrostatic pressure in the cavity, which in turn is equivalent to the hydrostatic pressure of the liquid in the cavity at a submerged level; and the hollow housing having a cavity flush inlet for periodic connection to a supply of high pressure fluid, whereby accumulated sediment can be flushed from the cavity.

11. A hydrostatic pressure equalizer system for measuring hydrostatic pressure at a submerged depth in a liquid, the system comprising:

a tubular line having a first, outlet end and a second end;

a hollow member for submerging in a liquid medium to be monitored, the member having an internal cavity connected to the outlet end of the line;

the cavity having a closed upper end and a lower end;

an end plate partially closing the lower end of the cavity to leave a gap for flow of liquid into the cavity, the end plate having an opening;

the outlet end of the line extending through the opening in the end plate and into the cavity, and terminating at a predetermined raised position which will be above a normal liquid level when the cavity is submerged;

a gas supply connected to the second end of the line;

a pressure responsive instrument connected to the second end of the line for producing an output proportional to the pressure in the line;

a data processing unit connected to the output of the pressure responsive instrument for correcting the pressure output for various systematic errors and providing a corrected output signal at periodic intervals; and a guide tube projecting upwardly from the plate opening into the cavity, the gas supply line extending through the opening and upwardly through the tube up to the predetermined height above the normal water level in the cavity.

12. The system as claimed in claim 11, including a valve for controlling the supply of gas to the line.

13. The system as claimed in claim 12 including a water level detector mounted in the cavity and linked to the gas supply valve for turning on or increasing the gas supply when the water level rises to a predetermined maximum level in the cavity.

14. The system as claimed in claim 11, including a support at the bed of a body of water, the hollow member being secured to the support with the end plate raised above the support to leave an access gap, the line extending along said access gap and into the plate opening from beneath the hollow member.

15. The system as claimed in claim 11, wherein the hollow member is buried in sediment in the bed of a body of water.

16. A hydrostatic pressure equalizer system for measuring hydrostatic pressure at a submerged depth in a liquid, the system comprising:

a tubular line having a first, outlet end and a second end;

a hollow member for submerging in a liquid medium to be monitored, the member having an internal cavity connected to the outlet end of the line;

the cavity having a closed upper end and a lower end;

an end plate partially closing the lower end of the cavity to leave a gap for flow of liquid into the cavity, the end plate having an opening;

the outlet end of the line extending through the opening in the end plate and into the cavity, and terminating at a predetermined raised position which will be above a normal liquid level when the cavity is submerged;

a gas supply connected to the second end of the line;

a pressure responsive instrument connected to the second end of the line for producing an output proportional to the pressure in the line;

a data processing unit connected to the output of the pressure responsive instrument for correcting the pressure output for various systematic errors and providing a corrected output signal at periodic intervals; and the hollow member having a cavity flush inlet for periodic connection to a supply of high pressure fluid, whereby accumulated sediment can be flushed from the cavity.

17. A method of measuring the hydrostatic pressure of a liquid at a submerged level in a liquid, comprising the steps of:

securing the upper end of a capillary line to a gas supply and to a pressure responsive instrument;

positioning a housing having an internal cavity at the bed of a body of liquid, the housing having a closed upper end and a lower end, an end plate extending across the lower end to leave a gap at the lower end of the cavity for entry of liquid into the cavity up to a predetermined level dependent on the hydrostatic pressure of the surrounding liquid, with an air pocket defined above the liquid level in the cavity; the end plate having an opening and a guide tube projecting upwardly from the opening into the cavity to a predetermined height above the liquid level in the cavity;

extending the second end of the line through the opening in the lower end plate of the housing and upwardly through the guide tube to terminate in the air pocket above the liquid level in the cavity, whereby the output of the pressure responsive instrument is a function of the gas pressure in the cavity, which in turn is equal the hydrostatic pressure of liquid in the cavity and the region surrounding the cavity.

18. The method as claimed in claim 17, wherein gas is supplied intermittently to the cavity.

19. The method as claimed in claim 17, wherein a continuous flow of gas is supplied to the cavity.

20. The method as claimed in claim 19, wherein the flow rate is of the order of one milliliter per minute.

21. The method as claimed in claim 17, including the step of burying the housing and attached line in sediment at the bed of a body of water.

* * * * *